L. E. BAKER.
SETTING MECHANISM FOR INDICATING REGISTERS.
APPLICATION FILED AUG. 8, 1918.
1,379,738.
Patented May 31, 1921.
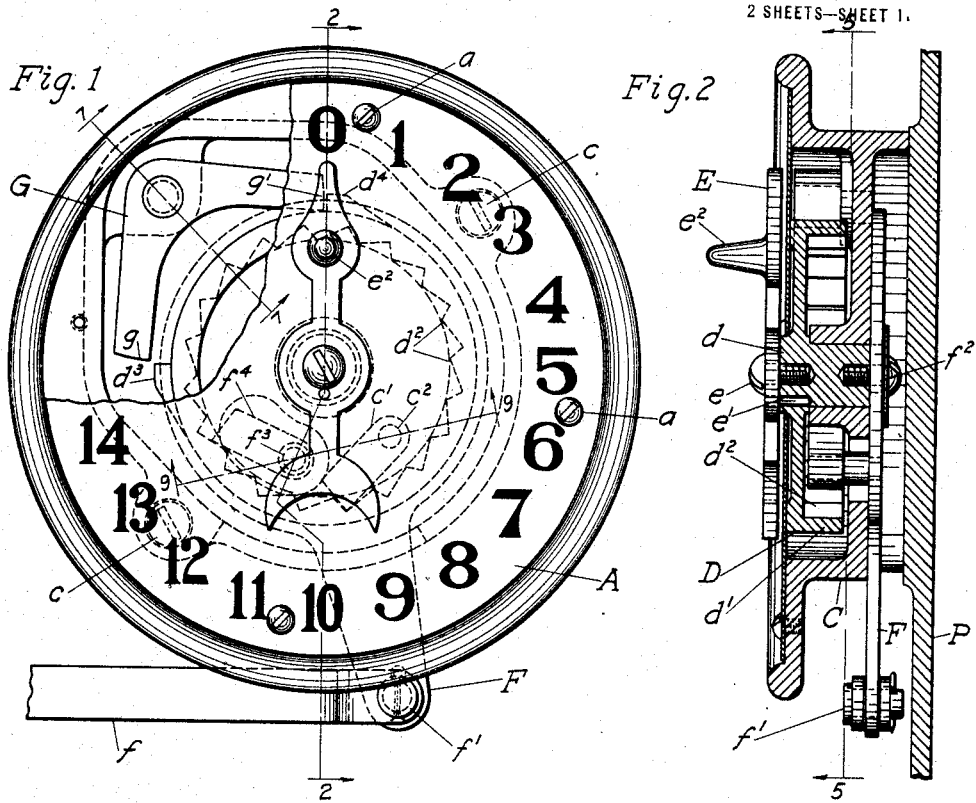
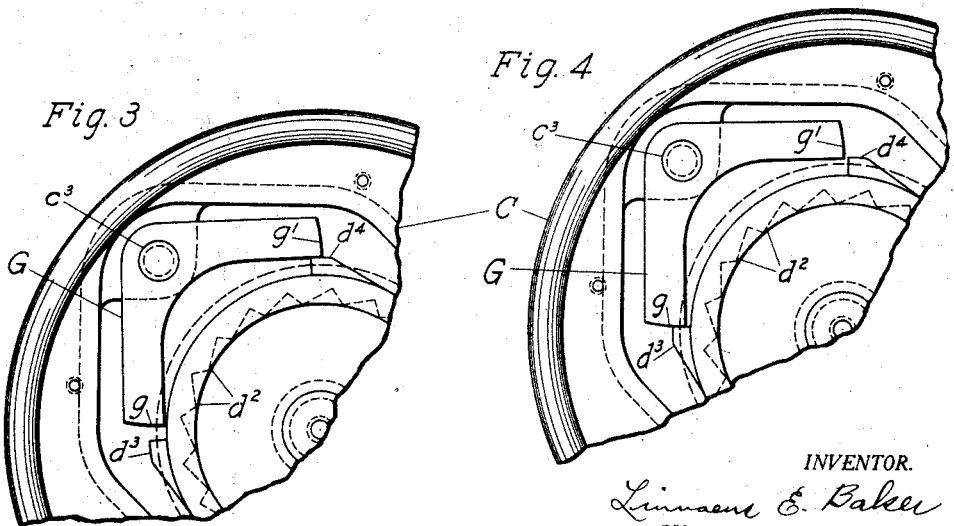
INVENTOR.
Linnaeus E. Baker
BY
Walter A. Knight
ATTORNEY.

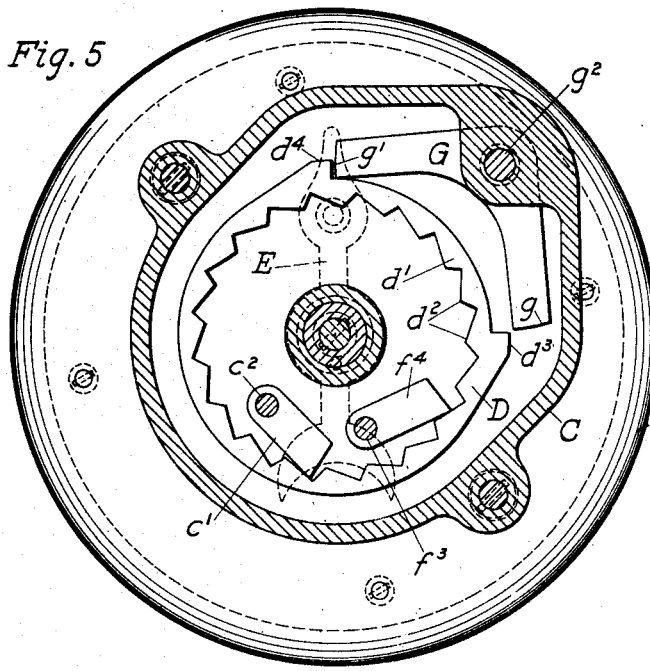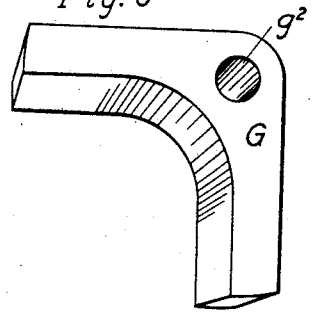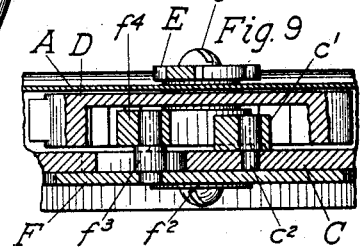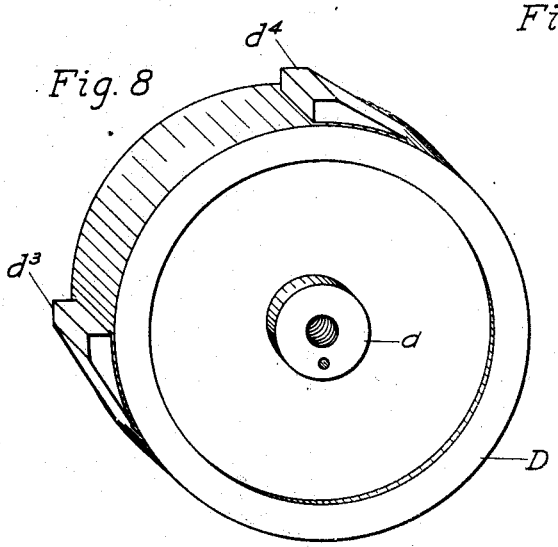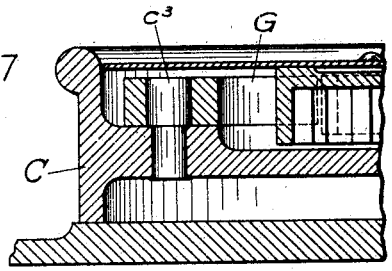

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

SETTING MECHANISM FOR INDICATING-REGISTERS.

1,379,738.     Specification of Letters Patent.     Patented May 31, 1921.

Application filed August 8, 1918. Serial No. 248,885.

*To all whom it may concern:*

Be it known that I, LINNAEUS E. BAKER, a citizen of the United States, residing at Fort Wayne, in the county of Allen and State of Indiana, have invented new and useful Improvements in Setting Mechanism for Indicating-Registers, of which the following is a specification.

My invention is a setting mechanism for counters, indicators and the like, such as the counters, registers and meters on measuring pumps.

It provides simple means for easily, yet quickly and positively establishing a definite predetermined relation between the pointer or indicator and the dial or scale; as a starting point preliminary to the normal operation of the machine to which the counter or indicator is attached. This "setting" operation, as it may be called, is accomplished by grasping the movable part and traversing it rapidly clock-wise toward the intended setting position. When reaching said position the motion is automatically arrested and upon relaxing the grasp the pointer or indicator remains in position, but free, when the functioning machine is then operated, to continue the motion just arrested.

It is immaterial whether the pointer or indicator moves with relation to a fixed dial or scale, or the dial or scale moves with relation to a fixed pointer or indicator.

The hereinafter described and illustrated embodiment of my invention, may be regarded as an improvement upon the device shown in Letters Patent No. 1,270,098 issued to me on June 18, 1918;—although the principle involved may be advantageously applied to other mechanisms used for various purposes.

In the particular embodiment of my invention selected for illustration, my invention is shown in relation to a counter for a measuring pump, in which the pointer is the movable part, and the dial is stationary.

Figure 1 is a front view of a counting device; with my improved setting mechanism added; partially exposed to view by breaking away a portion of the dial or scale, the rest being shown in dotted lines.

Fig. 2 is a sectional view taken on the line 2—2 of Fig. 1, but with pointer and lever with its driving pawl and stud, shown full.

Figs. 3 and 4 are still other front views with dial and pointer removed showing the stop member of my setting mechanism in successive positions while functioning.

Fig. 5 is a section along the line 5—5 of Fig. 2 as though the device was there shown complete.

Fig. 6 a detail is a perspective view of the stop member.

Fig. 7 is a sectional view taken on the line 7—7 of Fig. 1 with the stop member stud shown full.

Fig. 8 a detail is a ratchet wheel with lugs adapted to engage the stop member, and Fig. 9 is a section along the line 9—9 of Fig. 1.

Referring now to the drawings, P is a stationary part of the pump to which the casing C of the setting mechanism is attached by screws $c$ or in any other suitable manner. A fixed dial A is attached to the front of the casing C by screws $a$. A ratchet wheel D which is journaled in the center of the casing C, has a central boss $d$ extending through the center of the dial A and to this boss is fixed a pointer E by a screw $e$ and the dowel-pin $e^1$. The pointer E has a handle $e^2$ for convenience in rotating. Ratchet teeth $d^2$ are formed on the inner side of the flanged edge $d^1$ of the ratchet wheel D.

To a moving part of the pump (not shown) as the crank shaft or any part driven thereby is attached a link $f$ pivoted to the lever F, at $f^1$. The lever F is journaled at $f^2$ to the ratchet wheel D, at its axis. A stud $f^3$ fixed in the lever F, carries a pawl $f^4$ adapted to engage the ratchet teeth $d^2$, to rotate the ratchet wheel D when the lever F is oscillated; while a pawl $c^1$ carried on the stud $c^2$ fixed in the casing C also engages the teeth $d^2$ and prevents reverse rotation of the ratchet wheel D.

The ratchet wheel D has on its periphery two opposing lugs $d^3$, $d^4$ adapted to engage the ends $g$, $g^1$, respectively of the double-pawl G which is pivoted at $g^2$ on the stud $c^3$ fixed in the casing C. The double pawl is so pivoted that its weight tends to keep the end $g^1$ normally depressed.

The operation of my described setting mechanism is as follows:

Assume that the pointer E is at some position other than at zero, for instance 12 if 12 gallons has last been pumped; before beginning to make delivery to another customer, grasp the handle $e^2$ and rotate the pointer clock-wise rapidly until the pointer nearly reaches zero, when the position of the double pawl and ratchet wheel lugs will be as shown in Fig. 3, because lug $d^4$ has raised the end $g^1$ of the double pawl, bringing the end $g$ automatically into position for engagement with the approaching lug $d^3$; which takes place and is maintained temporarily by frictional contact, so that at zero the position of these parts will be as shown in Fig. 4, preventing further forward rotation of the pointer, until removal of hand pressure through the pointer from between the end $g$ of the double pawl and the lug $d^3$ permits the double pawl to gravitate automatically to its normal position, shown in Fig. 1.

Normal operation of the pump will then cause the pointer to correctly indicate the number of gallons delivered on the next count from zero as the point of beginning.

I claim as my invention, and desire to secure by Letters Patent of the United States:

1. In an indicator capable of rotation in one direction only, the combination of a rotatable element and a non-rotatable element adapted together to indicate quantity, the rotatable element being driven by the mechanism to which the indicator is attached; a cam on the rotatable element whose receding portion forms two positioning shoulders disposed in opposition to each other; the nonrotatable element constituting resetting means with engagement faces disposed in opposition to each other, one of said faces adapted to be brought into engagement upon rotation of the cam with its opposing shoulder by action of the cam on the nonrotatable element, arresting rotation at the starting point on the indicator, and then to drop into the receding portion of the cam and free said face of said shoulder.

2. In a ratchet driven indicator, the combination of a rotatable element and a nonrotatable element adapted together to indicate quantity, the rotatable element being driven by the mechanism to which the indicator is attached; a cam on the rotatable element having a receding portion contiguous to a positioning shoulder, said receding portion forming an escapement detent; an oscillating element constituting resetting means and having a face adapted to be moved into engagement with said shoulder at the starting point by the pressure of the cam on another portion of said oscillating element, whereupon said other portion of the oscillating element enters the receding portion of said cam and frees said face of said shoulder.

In testimony whereof I have hereunto set my hand in presence of two subscribing witnesses.

LINNAEUS E. BAKER.

Witnesses:
LAWRENCE H. PARROT,
CLARA BICKEL.